No. 806,625. PATENTED DEC. 5, 1905.
E. BEECHER.
PROCESS OF MANUFACTURING RUBBER SHOE UPPERS.
APPLICATION FILED SEPT. 19, 1904.

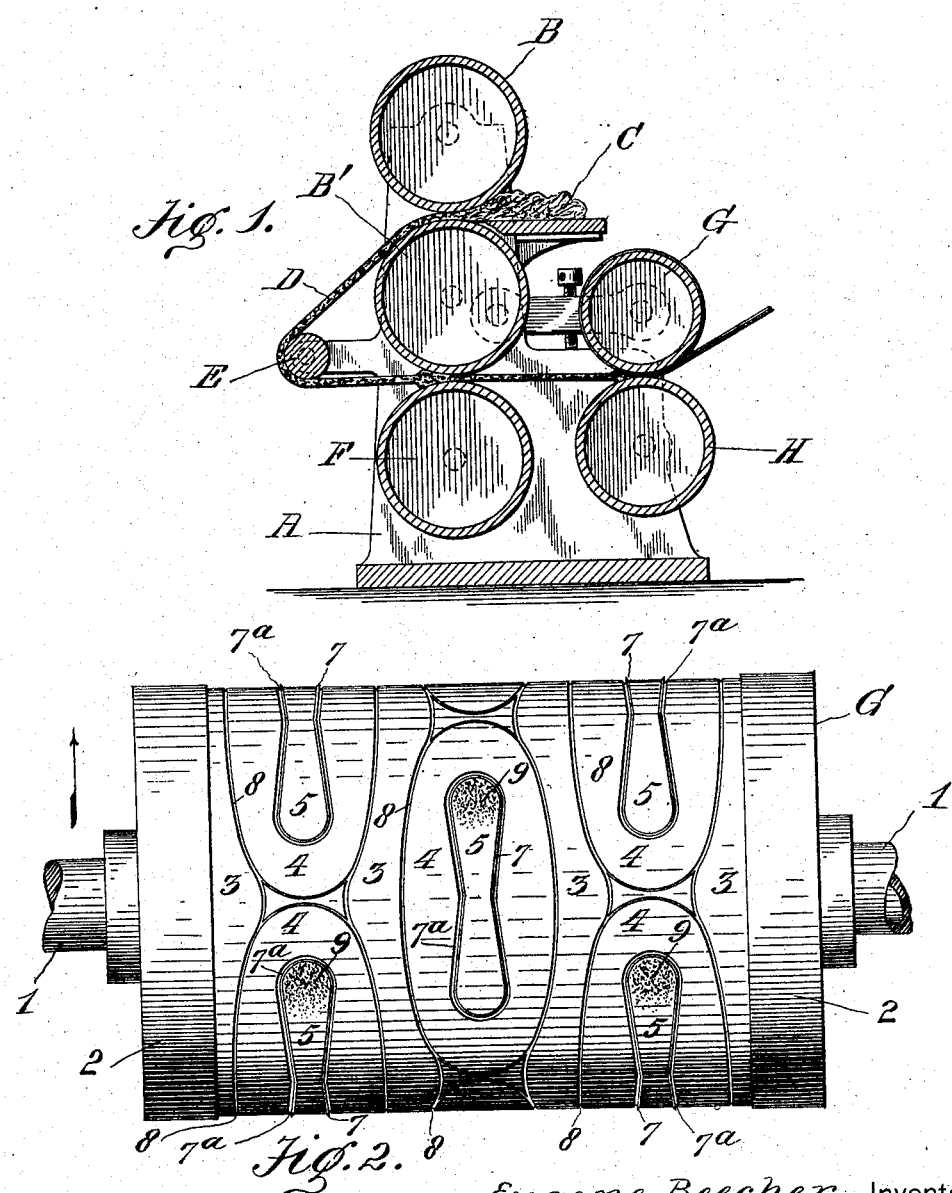

2 SHEETS—SHEET 2.

Witnesses:
A. J. Hugor
J. H. Gibbs

Eugene Beecher, Inventor,
By Marion & Marion
Attorneys

UNITED STATES PATENT OFFICE.

EUGENE BEECHER, OF MONTREAL, CANADA.

PROCESS OF MANUFACTURING RUBBER-SHOE UPPERS.

No. 806,625. Specification of Letters Patent. Patented Dec. 5, 1905.

Application filed September 19, 1904. Serial No. 225,006.

*To all whom it may concern:*

Be it known that I, EUGENE BEECHER, a citizen of the United States of America, residing at the city of Montreal, district of Montreal, in the Province of Quebec, Canada, have invented certain new and useful Improvements in Processes of Manufacturing Rubber-Shoe Uppers; and I do hereby declare that the following is a full, clear, and exact description of the invention, such as will enable others skilled in the art to which it appertains to make and use the same.

The process hereinafter described is carried out by means of mechanism which, except as hereinafter specified, is in common use in the manufacture of rubber-shoe uppers, which mechanism is illustrated in the annexed drawings, wherein—

Figure 3:
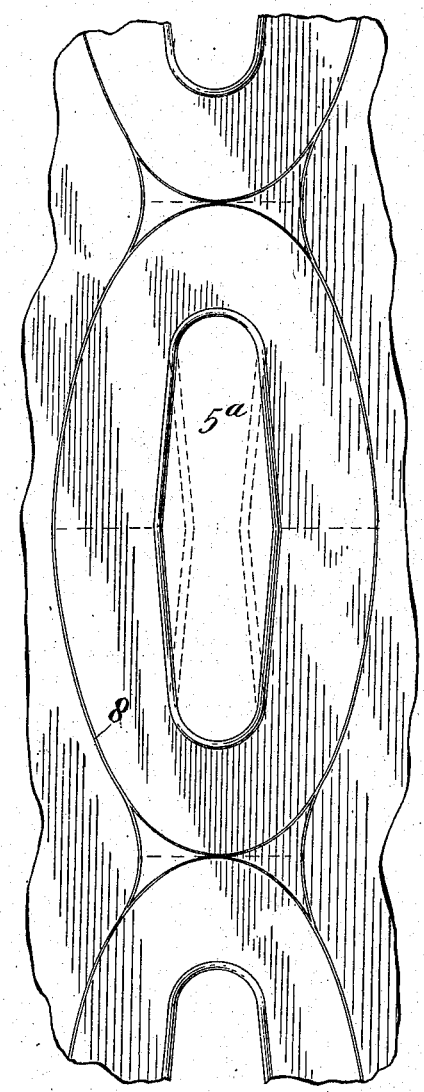
Figure 4:
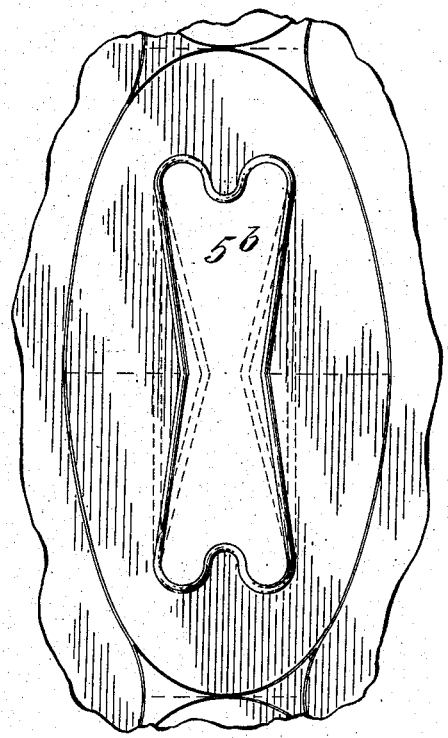
Figure 5:
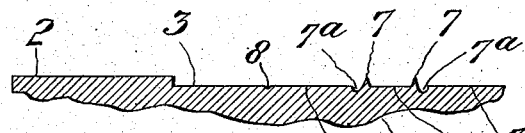
Figure 6:

Figure 1 is a vertical sectional view illustrating diagrammatically a machine adapted to carry out the hereinafter-described process. Fig. 2 is a detached side elevational view of a forming-roller hereinafter referred to. Fig. 3 is a plan view of a fragment of a sheet of rubber stock, showing a pair of uppers joined with fragmentary portions of other uppers connected therewith. Fig. 4 is a fragment of a sheet of rubber with modified type of upper from that shown in Fig. 3, while in Figs. 3 and 4 dotted lines indicate other modifications in the types of uppers. Fig. 5 is a fragmentary sectional view taken through a portion of the surface of the roller shown in Fig. 2, and Fig. 6 is approximately an end view of Fig. 3.

This invention relates to new and useful improvements in the process of manufacturing rubber articles; and it consists in certain features of novelty in the manipulation thereof and in the means employed for carrying out the process, all as hereinafter more fully described, and specifically pointed out in the claims.

The object of the process is to form rubber into such convenient form that articles to be manufactured therefrom may be cut from the sheet or strips produced by this process without the aid of skilled labor, whereby economy will result in the manufacture of such articles; and it consists in the steps hereinafter specified, by means of which steps and the apparatus incident thereto a practically continuous supply of blanks are formed which are available in the manufacture of rubber articles.

The invention is capable of application particularly to the manufacture of uppers to be used in producing rubber shoes and the like, though with modifications in the forming or die roller it may be adapted for use in the production of various articles formed from sheet-rubber.

In the manufacture of rubber shoes as now produced the rubber is fed in a substantially solid condition to and between steam-heated rollers which form the rubber into a continuous sheet, which sheet while still hot and semiplastic is passed between a forming-roller and a smooth roller, so that one surface of the sheet will be embossed according to the design of the article to be formed and the other side will present a smooth surface. This sheet is carried to a conveniently-arranged cutting-table upon which it is placed so that the shoe-uppers may be cut from the sheet. In rubber factories, according to the process now in vogue, great skill is required in cutting out certain parts of the sheet so prepared, while other parts of the sheet may be cut by less skilled labor. For example, in the manufacture of rubber shoes a surplus of stock is commonly cut from the sheet and the upper is folded over and upon a last, while the surplus stock is carried down under the sole portion of the last, where a part of said stock may remain; but great dexterity is required in trimming the upper so that the upper edge thereof will conform exactly to a predetermined line, which is generally indicated by embossing the material along said line. If means are provided for dividing the sheet by means of the forming or die roller so that a portion of such sheet will adhere to the die-roller, it will work back and become merged in the sheet of plastic or semiplastic rubber which is being fed to said die-roller, so that, assuming a roller of the form shown in the accompanying drawings acting upon a sheet of semiplastic rubber, as hereinafter described, certain portions of the rubber brought into contact with said die-roller will pass beyond said die-roller and leave the machine, while other portions thereof will adhere to the die-roller and work back into the material which is fed to such roller, thereby producing two desirable results: first, leaving blank or open spaces in the sheet or strip taken from the die-roller, and, second, resulting in economy of production in that such material may be utilized in conjunction with the sheet fed to the die-roller and resulting in the saving of time incident to cutting out the material from the sheet as now formed.

In the drawings a machine is illustrated for the purpose of carrying out this process, in which machine there is provided a series of steam-heated rollers between which the rubber is passed for the purpose of forming the sheet to be fed to the die-roller, near which is placed the die-roller, from which project raised irregular lines adapted to cut the semiplastic material which is fed to the die-roller. For the purpose of better understanding the process a particular description of this die-roller is necessary and is as follows: The said roller is supported upon trunnions 1, one of which is hollow for the admission of steam to the interior of said roller and is provided with annular flanges 2, between which flanges there are provided surfaces 3 of predetermined conformation, there being on the roller shown in the drawings four of such surfaces 3, between which there are arranged three sets of dies. Within these dies there are provided surfaces 4 and 5, respectively, the surface 4 projecting from the surfaces 3, if desired, or being in the same relative plane therewith, while the surface 5 is preferably formed so as to project to the plane of the surface 4 and is separated therefrom by the raised lines 7 and channels 7ª. This die-roller is so positioned with relation to its companion roller that the sheet of hot rubber may pass between the die-roller and its companion roller for the purpose of forming a substantially continuous sheet of rubber, whereupon there is provided embossed lines corresponding to the lines 8 of the die-roller, which are approximately elliptical in form and surrounding the space 4. Within the elliptical space 4 the section 5 is formed in such position with relation to said space 4 that if the material acted upon by the surface 5 is cut from the surface 4 then each of the spaces 4 will contain a pair of uppers from which the material above the instep of the shoe has been eliminated. To better secure the result sought for, a portion of the space 5 is preferably roughened or rusted, as at 9, so that the rubber will adhere to the surface of the die-roller within said space 5. This roughened or rusted surface 9 is provided at the advance end of the space 5—that is, at the end which first strikes the semiplastic sheet in its passage between the die-roller and the next adjacent roller.

In the drawings there is shown a roller provided with a plurality of elliptical sections, each of which contains the surface 5 with roughened or rusted portion 9.

To emboss a sheet of rubber by means of a die-roller is not new; but to feed a sheet of rubber to a die-roller, emboss said sheet by means of said roller, and strip from the roller a continuous sheet of material to be used in the manufacture of rubber articles of predetermined form, which sheet is of less area than the area of the sheet fed to the die-roller is essentially novel, and this is accomplished by means of my improved process, whereby a sheet of rubber is formed by passing between heated rollers, and said sheet is then passed between a die-roller and a smooth roller, whereby a portion of the material is eliminated from the sheet as it is stripped from the die-roller, and further manipulation to eliminate such material is avoided.

When the die-roller is provided with series of irregular raised lines, as 8, adapted to form strips of rubber containing the elliptical sections 4 or sections of any form corresponding thereto and is provided with the rusted or roughened surface 9 within sections 5 a sheet may be fed to said die-roller, as described, and when said sheet is stripped from said roller the sheet will contain openings corresponding to the contour of the spaces or sections 5. If the raised lines 8 project a sufficient distance above the surfaces 3, then strips may be taken from the die-roller which correspond to said connected sections 4; but as the outline 8 is not imperatively necessary as a cutting edge it may be convenient to leave the sections 4 and the material formed on the spaces 3 intact to form a sheet with openings therein only corresponding to the sections 5. This may be advisable, owing to the nature of the material operated upon, which material has a tendency to shrink and curl up after it has left the die-roller, and if the material of the sheet corresponding to the spaces 3 is eliminated by means of the die-roller some difficulty may be encountered with the strips 4. However, means may be provided for quickly cooling the rubber strip after it has passed the die-roller. This process contemplates the employment of such cooling means. To accomplish the cooling, a blast of air may be directed upon the material after it has passed the die-roller, or such material may be passed through a cooling-bath of any suitable fluid, after which the shrinking tendency will not be injuriously developed.

As will be noted in the drawings, A indicates the supporting-frame of the machine. (Illustrated in Fig. 1.)

B B' indicate the heated rollers, which act upon the mass of rubber stock C and heat said stock to the running point to form said stock into a sheet D, which is then passed around the roller E and between the roller B' and the roller F, from which the sheet D passes between the die-roller G and a smooth roller H, between which the rubber stock is finally acted upon to form the uppers shown in outline on the roller of Fig. 2 or the uppers shown in plan view in Figs. 3 and 4. The style of uppers formed is immaterial and varies with the demands of the trade, and while I have referred to the elliptical sections 4 and the sections 5 it will be evident that the inner sections 5 may be approximately the shape shown at 5ª or 5ᵇ in Figs. 3 and 4, if desired. When the sheet D passes between the rollers G and H, the sections 5, 5ª, and 5ᵇ are eliminated from said sheet of rubber by reason of the fact that the roughened or rusted portion 9 of the roller G will cause the rubber to adhere to said roller G, and the sheet will pass from between said rollers with such portions eliminated therefrom. The elimination of said portions is assisted by means of the raised cutting edges 7 next the channels 7ª on said roller G.

If desired, the lines indicated by reference-numeral 8 may be formed by cutting channels in the surface of the roller G, in which case it will be evident that the sheet stripped from said forming-roller G will not be cut along said lines 8, but will be formed with a slight bead or elevation therein corresponding to the contour of said lines, which lines may be followed in cutting out the uppers by hand. In the drawings, Fig. 2, the line 8 is represented by a channel adapted to form such bead.

The mechanism employed forms no part of my invention except as to the particular manner of forming the working surface of the roller G, and I make no claim to any portion of said mechanism except to said roller G.

Having described my invention, what I claim, and desire to secure by Letters Patent, is—

1. The herein-described process which consists in reducing rubber stock to a plastic state, forming a sheet of rubber therefrom, forming openings in said sheet, and feeding back to the said sheet the material which is removed therefrom in forming said openings.

2. The herein-described process which consists in reducing rubber stock to a plastic state by the application of heat and pressure, forming a sheet of rubber therefrom, maintaining said sheet in a heated state, forming openings in said sheet, and feeding back to the said sheet the material which is removed therefrom in forming said openings.

3. The herein-described process which consists in reducing rubber stock to a plastic state, forming a sheet of rubber therefrom, forming openings in and embossing lines on said sheet, and feeding back to the said sheet the material which is removed therefrom in forming said openings.

4. The step in the process of forming uppers for rubber shoes comprising passing a sheet of rubber while in a semiplastic and heated condition between rollers which emboss lines thereupon and eliminating part of the said sheet and returning the portion thus eliminated to said sheet while still in a heated condition as it is fed to the rollers whereby the eliminated portion of the sheet is again fed to said embossing-rollers and the sheet of rubber is fed from said rollers with embossed lines thereupon and with portions of said sheet eliminated therefrom.

In witness whereof I have hereunto set my hand in the presence of two witnesses.

EUGENE BEECHER.

Witnesses:
FREDERICK H. GIBBS,
JOHN F. DEUFTERWIEL.